(12) United States Patent  
Koninckx et al.

(10) Patent No.: US 9,264,663 B2  
(45) Date of Patent: Feb. 16, 2016

(54) ULTRA LOW LATENCY VIDEO COMMUNICATION

(71) Applicant: ESATURNUS, Leuven (BE)

(72) Inventors: Thomas Koninckx, Blanden (BE); Dong Hoon Van Uytsel, Hamme-Mille (BE); Robert Koninckx, Leuven (BE)

(73) Assignee: ESATURNUS, Leuven (BE)

( * ) Notice: Subject to any disclaimer, the term of this patent is extended or adjusted under 35 U.S.C. 154(b) by 0 days.

(21) Appl. No.: 14/357,505

(22) PCT Filed: Nov. 12, 2012

(86) PCT No.: PCT/EP2012/072381  
§ 371 (c)(1),  
(2) Date: May 9, 2014

(87) PCT Pub. No.: WO2013/068584  
PCT Pub. Date: May 16, 2013

(65) Prior Publication Data  
US 2014/0307043 A1    Oct. 16, 2014

(30) Foreign Application Priority Data  
Nov. 10, 2011 (GB) .................................. 1119433.9

(51) Int. Cl.  
*H04N 7/14* (2006.01)  
*H04N 19/176* (2014.01)  
(Continued)

(52) U.S. Cl.  
CPC ............. *H04N 7/147* (2013.01); *H04N 19/174* (2014.11); *H04N 19/176* (2014.11); *H04N 19/436* (2014.11); *H04N 19/60* (2014.11)

(58) Field of Classification Search  
CPC ... H04N 19/60; H04N 19/174; H04N 19/176; H04N 19/436; H04N 7/147  
USPC ......... 250/208.1; 348/14.12, 36, 231.99, 716; 370/338; 375/240.26; 382/199, 239; 399/97; 463/31; 379/202.01; 455/426.1, 452.2; 700/94; 709/227  
See application file for complete search history.

(56) References Cited  
U.S. PATENT DOCUMENTS 5,592,237 A  *  1/1997  Greenway et al. ............. 348/716  
6,563,955 B2 *  5/2003  de Queiroz .................... 382/239  
(Continued)

FOREIGN PATENT DOCUMENTS

| EP | 2373037 A2 | 10/2011 |
|---|---|---|
| WO | 2006036661 A1 | 4/2006 |
| WO | 2007140322 A2 | 12/2007 |

OTHER PUBLICATIONS

Great Britain Search Report for corresponding Great Britain Application No. 1119433.9, search date Mar. 9, 2012.  
(Continued)

*Primary Examiner* — Gerald Gauthier  
(74) *Attorney, Agent, or Firm* — Workman Nydegger

(57) ABSTRACT

A video communication system comprising at least one video data transmission unit for sending or receiving video data over a data network is disclosed, as well as a corresponding video data transmission method. The transmission unit comprising an image acquiring circuitry or an image reconstruction circuitry for acquiring or reconstruction an image frame or image field, a video processing unit for processing at least part of the video data and a communication unit for sending or receiving at least part of the data. At least two of the image acquiring circuitry or image reconstruction circuitry, the video processing unit and the communication unit are arranged for simultaneously handling different parts of a same image frame or image same field of the video data.

20 Claims, 4 Drawing Sheets

(51) Int. Cl.
*H04N 19/60* (2014.01)
*H04N 19/174* (2014.01)
*H04N 19/436* (2014.01)

(56) References Cited

U.S. PATENT DOCUMENTS

| | | | | |
|---|---|---|---|---|
| 6,801,777 | B2* | 10/2004 | Rusch | H04W 48/18 |
| | | | | 455/450 |
| 7,457,878 | B1* | 11/2008 | Mathiske | H04W 4/02 |
| | | | | 709/227 |
| 7,657,202 | B2* | 2/2010 | Taki et al. | 399/97 |
| 7,813,562 | B2 | 10/2010 | Pallister | |
| 8,005,149 | B2* | 8/2011 | Lerner et al. | 375/240.26 |
| 8,155,448 | B2* | 4/2012 | Ida et al. | 382/199 |
| 8,208,741 | B2 | 6/2012 | Pallister | |
| 8,217,329 | B2* | 7/2012 | Chiang et al. | 250/208.1 |
| 8,472,732 | B2 | 6/2013 | Pallister | |
| 9,064,282 | B1* | 6/2015 | Carpenter | G06Q 30/08 |
| 2006/0072831 | A1 | 4/2006 | Pallister | |
| 2007/0165955 | A1 | 7/2007 | Hwang et al. | |
| 2007/0216782 | A1* | 9/2007 | Chernoff | 348/231.99 |
| 2007/0223675 | A1* | 9/2007 | Surin | H04L 12/1827 |
| | | | | 379/202.01 |
| 2008/0012872 | A1 | 1/2008 | Flickinger et al. | |
| 2008/0013504 | A1* | 1/2008 | Nishibayashi et al. | 370/338 |
| 2008/0253463 | A1 | 10/2008 | Lin et al. | |
| 2009/0066804 | A1 | 3/2009 | Kurokawa | |
| 2009/0192639 | A1* | 7/2009 | Cellier | H04H 60/04 |
| | | | | 700/94 |
| 2009/0305694 | A1* | 12/2009 | Zheng | H04L 65/4084 |
| | | | | 455/426.1 |
| 2009/0305782 | A1* | 12/2009 | Oberg et al. | 463/31 |
| 2011/0001755 | A1 | 1/2011 | Pallister | |
| 2011/0247033 | A1 | 10/2011 | Okada et al. | |
| 2012/0044253 | A1 | 2/2012 | Pallister | |
| 2012/0293607 | A1* | 11/2012 | Bhogal et al. | 348/36 |
| 2013/0142428 | A1 | 6/2013 | Pallister | |
| 2014/0307043 | A1* | 10/2014 | Koninckx et al. | 348/14.12 |

OTHER PUBLICATIONS

International Search Report for corresponding International PCT Application No. PCT/EP2012/072381, mailed Jan. 22, 2013.

* cited by examiner

ULTRA LOW LATENCY VIDEO COMMUNICATION

FIELD OF THE INVENTION

The invention relates to the field of data communication. More specifically it relates to methods and systems for low or ultra low latency video communication.

BACKGROUND OF THE INVENTION

Video data can be considered a three dimensional array of color or luminance data, depending if one refers to color or grayscale video. Two dimensions—horizontal and vertical—of this three dimensional array represent spatial data or so called pixels of a video image, whereas the third dimension represents the time domain of consecutive images. Hereafter each video image will be called a frame. A frame of pixel data generated by an imaging sensor is typically transferred to a processing or visualisation unit by serialising the data, and sending it via one or a limited set of communication lines. This said, the two dimensional spatial data of a single frame are transferred via a single communication line as a consecutive series of data in time. This communication line can carry analog data or digital codewords representing the original pixel data. By using multiple communication lines, data can be transferred more in parallel (e.g. some systems transfer red, green, blue and synchronization data in parallel). The above description typically explains how a camera system transports via a single cable its consecutive frame data to a display. A digital display will collect all consecutive data of a single frame in a buffer, and once the frame is completed it will present it to the display matrix for visualisation. In the remainder of this text, this will be referred to as a 'direct video link'.

Video or image compression refers to bandwidth reduction either in the spatial domain (image compression) or in the spatial and temporal domain simultaneously (video compression). The principal goal of compression is to reduce the amount of data (bandwidth). The latter can either be done without losing any information (lossless compression). This said the original frame data can be reconstructed identically based on the compressed frame data, and is a bit-by-bit perfect match to the original. Alternatively compression can be done such that a human observer is unable to perceive the differences between the original and the compressed frame data (visual lossless compression). This said the original frame cannot be reconstructed identically, but a human observer typically will not see the differences between the original and reconstructed frame. Lastly compression can be 'lossy' and lower the amount of visual information in order to receive a strongly improved compression efficiency. Video compression exploits the fact that pixel data is typically strongly temporal and spatial redundant. Compression can be achieved by storing the differences between a pixel and one or more references spatially (intra-frame: e.g. used in the JPEG compression scheme) and by storing the differences between consecutive frames in the time domain (inter-frame: e.g. used in the MPEG compression scheme). Additionally, given that the human eye is not very sensitive to subtle variations in intensity and/or color, further compression can be obtained by reducing the amount of different variations which are retained after compression. Combinations of these techniques form the basics behind modern nowadays compression schemes like e.g. used in the MPEG1-MPEG2 and MPEG4 families and related.

A communication protocol is an agreement between computing or telecommunication systems for exchange of information. Communication protocols used on the internet/intranet are designed to function in a complex and uncontrolled setting. The design hereto typically uses a layering scheme as a basis, which decouples a larger and more complex protocol in distinct, easier to manage sub-protocols. The Internet protocol suite consists of the following layers: application-, transport-, internet- and network interface-functions. The Internet hereby offers universal interconnection, which means that any pair of computers connected to the internet is allowed to communicate. All the interconnected physical networks appear to the user as a single large network. This interconnection scheme is hence called the internet.

Communication protocols may include signaling, authentication, encryption and error detection and correction capabilities.

Video communication can be obtained through an electrical or optical 'direct cable' carrying raw video data, minimally or not compressed and typically using no higher level communication protocols. The classic cable based system typically yields fast low latency communication, but consumes high bandwidths and normally cannot be tunnelled through a complex communication network like the internet or an intranet. Additionally, traditional video cabling typically imposes limited maximum cable lengths, or it has to be extended with expensive and/or signal-specific technology such as UTP extenders, fiber-optic extenders, and satellite connections. Then, again, these technologies incur high costs for relatively limited flexibility to put multiple channels on the same "wire" and/or receive the same channel on multiple receivers.

Internet capable video communication systems (e.g. used for telepresence) typically offer strong compression and work seamlessly over the internet/intranet, but always introduce a delay of one or more frames. In other words complex communication protocols and compression imply delay.

Despite the advanced stage of current systems for video communication there remains a need for a system combining low latency, strongly compressed internet/intranet capable video communication and possibly offering high visual quality. There is a lack of method or apparatus that could use the internet/intranet—or a communication channel of similar complexity—to send and receive video data with only a delay which is less than half of the time between two consecutive frames in the video feed presented to the sending unit. In other words, the surplus delay when compared to a 'direct video link' (cfr. sup.) of any prior system typically seems at least half of the inter frame time interval.

SUMMARY OF THE INVENTION

It is an object of the present invention to provide good systems and methods for low or ultra low latency video communication.

It is an advantage of embodiments according to the present invention that methods and systems are provided for low or ultra low latency video communication, comprising a sending unit which combines the acquisition, compression and transmission of video data. In addition the system can be complemented by an inverse receiving unit which collects and possibly reorders compressed data packets, decompresses them and renders the reconstructed video data.

It is an advantage of embodiments according to the present invention that these yield similar communication speeds as classic cable but in surplus show a delay of maximum 5 milliseconds, at typically 3 to 15 times lower bandwidth consumption.

It is an advantage of embodiments according to the present invention that communication is allowed using a higher level protocol like the Internet Protocol (IP) which can be easily carried over internet or intranet and can e.g. also incorporate encryption/decryption or the like. When compared to existing video communication systems used for internet or intranet data transmission, embodiments of the present invention typically are between 5 and 50 times faster in terms of delay.

It is an advantage of embodiments according to the present invention that devices are obtained combining low delay and relatively low bandwidth, without the need for using a 'direct video link'. Embodiments provide a solution in a situation where we need low delay, lower bandwidth and cannot provide one or more 'direct video links'. This typically can occur in a situation where a human observer has to instantaneously act on what he or she sees, like e.g. in medical endoscopy. Similar situations can be found in any high speed feedback video based control loop.

It is an advantage of embodiments of the present invention that these provides solutions by combining video acquisition, low latency compression and the possibility to use a high level communication protocol, with a delay which is lower than half of the inter frame time interval.

The above objective is accomplished by a method and device according to the present invention.

The present invention relates to a video data communication system comprising at least one video data transmission unit for sending or receiving video data over a data network, the transmission unit comprising an image acquiring circuitry or an image reconstruction circuitry for acquiring or reconstruction an image frame or image field, a video processing unit for processing at least part of the video data and a communication unit for sending or receiving at least part of the data, wherein at least two of the image acquiring circuitry or image reconstruction circuitry, the video processing unit and the communication unit are arranged, e.g. configured, for simultaneously handling different parts of a same image frame, the parts not being a complete image field, or different parts of a same image field of the video data. It is an advantage of embodiments according to the present invention that a video communication system can be obtained combining low latency and low bandwidth use.

All of the image acquiring circuitry or image reconstruction circuitry, the video processing unit and the communication unit may be arranged for simultaneously handling different parts of a same image frame or same image field of the video data. It is an advantage of embodiment according to the present invention that gain in speed can be obtained by simultaneous processing in image acquisition or merging, image encoding or decoding and image sending or receiving.

The image acquiring circuitry may comprise an image divider for dividing an image frame or image field into image blocks comprising a part of the image frame or field being one or more lines of pixels of the image frame or field or the image reconstruction circuitry comprises an image merger for merging image blocks comprising only a part of an image frame or image field being one or more lines of pixels of the image frame or field in a full image frame or image field. An image block may be an image slice.

The video communication system may comprise an image block header generating means for generating an image block header for the image block for identifying an image frame or field wherefrom the image block is derived.

The video processing unit may comprise an encoder or decoder adapted for encoding or decoding image blocks comprising only a part of an image frame or image field.

The communication unit may be adapted for sending or receiving data representative of an image block comprising only a part of an image frame or image field.

The at least one video data transmission unit may be a video sender or a video receiver. It is an advantage of embodiments according to the present invention that the advantageous processing can be implemented at the sender side as well as at the receiver side.

The video communication system may comprise both a video sender comprising an image acquiring circuitry, a video processing unit and a communication unit arranged, e.g. configured, for simultaneously handling different parts of a same frame or same field of the video data and a video receiver comprising a communication unit, a video processing unit and an image reconstruction circuitry arranged for each simultaneously handling parts of a same frame or same field of the video data, the system furthermore being adapted for the video sender and the video receiver simultaneously handling parts of the same frame or same field of the video data. It is an advantage of embodiments according to the present invention that advantageous handling can be performed simultaneously at the sender side and the receiver side, resulting in an ultrafast video communication system, for example having no perceivable delay when compared to direct cable video.

The reconstruction circuitry may be adapted for reconstructing frames or fields taking into account image block headers of the image blocks.

The video communication system may be a software-implemented controller.

The video processing unit may comprise a compressing or decompressing unit configured for compressing or decompressing image blocks comprising only a part of an image frame or image field.

The video processing unit may comprise an encrypting or decrypting unit configured for encrypting or decrypting image blocks comprising only a part of an image frame or image field.

The present invention also relates to a method for transferring video data, the video data comprising image frames or image fields of video data, the method comprising acquiring or reconstructing an image frame or image field, processing at least part of the video data, and sending or receiving at least part of the data, wherein at least two of said acquiring or reconstructing, processing and sending or receiving are performed simultaneously by simultaneously handling different parts of the same image frame, the parts not being a complete image field, or different parts of the same image field of the video data.

All of said acquiring or reconstructing, processing and sending or receiving may be performed simultaneously by simultaneously handling different parts of the same image frame, the parts not being a complete image field, or different parts of the same image field of the video data.

The method may comprise obtaining at least a first image block and a second image block, each image block being part of a same image frame or a same image field, after obtaining the at least a first image block and during obtaining of the second image block, processing the first image block, and thereafter, before or during processing of the second image block, sending the first image block over a data network.

The method further may comprise, upon receiving at least a first image block and a second image block, generating an image block header for the image block for identifying an image frame or field wherefrom the image block is derived.

The method may comprise receiving at least a first image block and a second image, each image block being part of a same image frame or a same image field, over a data network, after receiving the first image block and before or during receiving of the second image block, processing the first image block, and thereafter merging the at least first image block and the second image block, after these image blocks have been processed, into a single image frame or image field.

At least said merging may be performed taking into account an image block header for the image block for identifying an image frame or field wherefrom the image blocks are derived.

The present invention also relates to a computer program product for, when executing on a processing unit, transferring video data according to any of the methods as described above. The present invention also relates to a data carrier medium storing such a computer program product The present invention furthermore relates to video data obtained using a method for transmitting video data as described above.

The present invention also relates to the use of a video data communication system as described above in transmission of endoscopic video data.

The present invention furthermore relates to the use of a video data communication system as described above for combining multiple video data inputs and for providing multiple video data outputs or providing a merged data output.

The present invention also relates to the use of a video data communication system as described above for obtaining visual delay free transport of video data.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
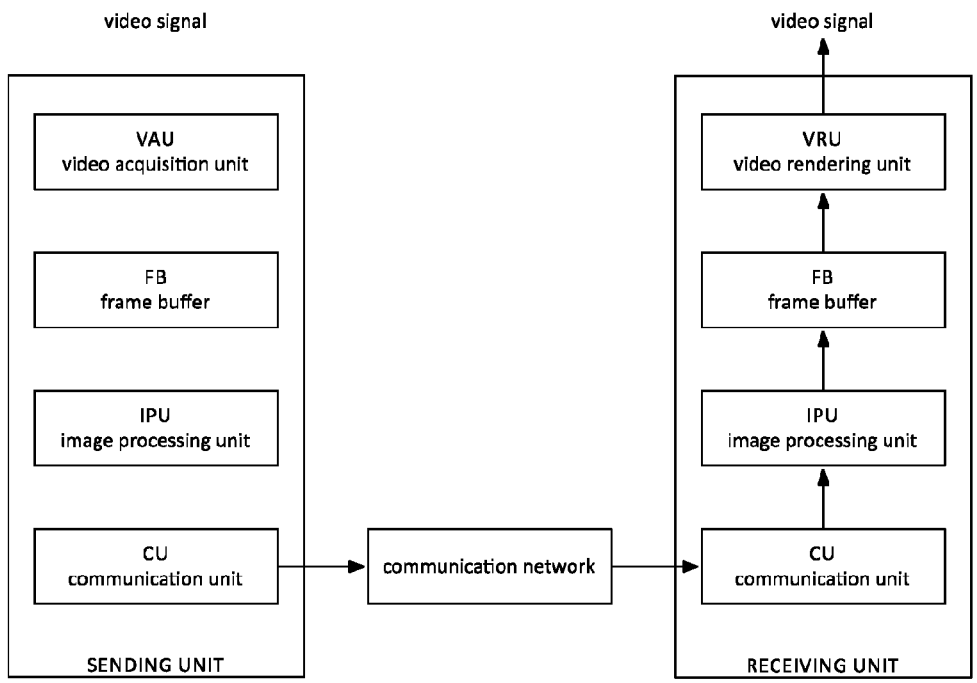
FIG. 1 is a block diagram of a classic video communication architecture, comprising a sending video communication unit and a receiving video communication unit, as known from prior art.

The drawings are only schematic and are non-limiting. In the drawings, the size of some of the elements may be exaggerated and not drawn on scale for illustrative purposes.

Any reference signs in the claims shall not be construed as limiting the scope.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Where in embodiments, description or claims of the present invention reference is made to part of an image frame or part of an image field, reference may be made to only part of an image frame or only part of an image field, i.e. not to the full image frame or the full image field.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments according to the present invention reference is made to endoscopy, reference is made to techniques used to inspect or to look into internal cavities or hollow structures. Endoscopy is used today for medical applications and for industrial applications such as for instance in the visual inspection of aircraft, diesel and automotive engines by so called borescopes. In the medical field endocospes are used for life saving inspections and interventions such as endoscopic surgery on organs in a patient's body cavity. Borescopes allow preventive maintenance or inspection work where the area to be inspected is inaccessible by other means. They can for instance be used for preventive maintenance and inspection tasks on targets within an enclosed structure such as aircraft engines and others which require particular attention because of safety requirements. In the remainder of this text only the medical field will be used to illustrate the new apparatus. Its applicability, however, extends without limitations to the industrial working domain.

Where in embodiments according to the present invention reference is made to a same image or video frame, reference is made to a single image or shot, that shows the entire content of a scene at a single moment in time that is to be shown, typically shown as part of a larger video data. Typically, many single image frames are run in succession to produce what appears to be a seamless piece of video data.

Where in embodiments according to the present invention reference is made to a same image or video field, reference is made to a selected set of image lines of an image frame, e.g. all odd or even image lines, still representative of the entire content of a scene at a single moment in time that is to be shown.

Where in embodiments according to the present invention reference is made to an image block, reference is made to a part of an image frame or image field that typically is not representative for the entire content of a scene at a single moment in time that it to be shown. Such an image block may consists of a set of pixels or a set of image lines, that typically only covers a portion of the scene that is shown with the image frame or image field, i.e. not the full scene that is shown with the image frame or image field.

Where in embodiments according to the present invention reference is made to the terminology image field, reference is made to the image data corresponding with only the odd or the even image lines of an image frame.

Where in embodiments according to the present invention reference is made to an image block, reference also may be made to an image slice. The image block or image slice may comprise one or more but not all lines of an image frame or an image field. Typically the image block or image slice is not representative for the full scene represented by the image frame or image field. The image block or image slice may in some particular embodiments comprise 8 lines, 16 lines or a multiple thereof.

According to a first aspect, the present invention relates to the video data communication process or a video data communication system for (ultra) low latency video communication. The system according to embodiments of the present invention comprises at least one video data transmission unit for sending or receiving video data. The transmission unit comprises an image acquiring circuitry or an image reconstruction circuitry for acquiring or reconstructing an image frame or image field. According to embodiments of the present invention, at least two of the image acquiring circuitry or image reconstruction circuitry, the video processing unit and the communication unit are arranged for simultaneously processing, i.e. handling, different parts of a same image frame or image same field of the video data. Advantageously, the image acquisition and/or image reconstruction, the processing and the communicating may be all performed simultaneously on different parts of the same image frame or same image field. The transmission unit may be a sending unit, a receiving unit or a combination of a sending and a receiving unit. The sending unit may combine the acquisition, processing, e.g. compression, and transmission of video data, and/or a receiving unit which combines collection and possibly reordering compressed data packets, processing, e.g. decompressing, data packets and rendering the reconstructed video data. The system of present invention can provide a solution to implement this communication at a delay less than half of the time in between two consecutive frames, and a typical delay of less than 5 milliseconds. The delay in between two consecutive frames may be less than half of the frame time. The refresh clock of a flat panel display matrix, or the read-out frame rate clock of a receiving frame buffer device, are typically not synchronized to the frame rate clock of the underlying camera system generating the image. Hence the delay introduced in present invention is typically smaller than the time until the next refresh in case of a flat panel, or than the time until the next read-out in case of a frame buffer. This said, the delay in present invention typically is not perceivable when compared to a 'direct video link'. This opens new possibilities for applications using (compressed) video transport over a communication medium like the internet/intranet.

The image acquiring circuitry or an image reconstruction circuitry for acquiring or reconstructing an image frame or image field may be adapted for acquiring an image block being only part of an image frame—not being a full image field—or being only part of an image field. The image acquiring circuitry may be adapted for providing an image block header. Such an image block header may comprise metadata such as for example an identification of the image frame it stems from, but it may also comprise metadata identifying for the processing unit that for processing no future frames may be taken into account.

The video processing unit may comprise a processor for processing the image block, i.e. part of the image frame or image field that has been acquired. Processors that may be used can for example be conventional processors used in processing of conventional images. In the present embodiments, the image blocks may thus be handled similar as conventional images, but the size of the image blocks typically has a high width to height ratio, as it typically may contain one or more but not all lines of the image frame or image field. Examples of image or video processors that may be used are MPEG advanced video coding (AVC), such as for example H.264, or VC1, although embodiments of the present invention are not limited thereto. Another example of a video processor that may be used is a Lempel Ziv or Lempel Ziv Welch based codec. The video processing unit may alternatively, combined therewith or in addition thereto also comprise a compression unit or decompression unit. The video processing unit may alternatively, combined therewith or in addition thereto also comprise an encrypting or decrypting unit. More generally, processing envisaged may include any type of processing allowing processing of part of an image frame or image field without the need for a lot of or any other information regarding to other parts of the image frame or image field, as corresponding processing can take advantage of the simultaneous handling as described herein.

The communication unit may be a unit that is adapted for sending or receiving image blocks. The communication unit thereby typically sends the image blocks including their image block header.

Whereas a typical classic video communication system is working frame or field based (a field is an interlaced frame containing only half of the data), the present disclosure presents an integrated embodiment which therefore can work in a subframe or subfield based manner, i.e. on different image blocks being only part of an image frame—not being a full image field—or image field. The system may comprise a controller for controlling the image acquiring circuitry or an image reconstruction circuitry for acquiring or reconstructing an image frame or image field in such a way that two or more of these components can operate simultaneously on parts (typically different parts) of the same image frame or same image field.

In order to clearly identify the advantages of embodiments of the present invention, it is illustrative to take a closer look at a classic video communication unit. In such a unit we identify three consecutive building blocks. First there is the acquisition building block, where frame data arrive serially via a 'direct video link'. A frame buffer accumulates all data of the arriving frame or field. Once the frame or field is completed, the data are passed to the next building block of the pipeline. Meanwhile the frame buffer starts already accumulating the next frame. This next building block is referred to as the image processing unit. It typically can do some image modifications or enhancements, and also can compress the video data. Next the data is transferred to a last building block, referred to as the communication unit. This communication unit will implement a digital or analog communication protocol in order to send the data over a communication channel. At this stage encryption or similar protocol specific functionality can be added. At the receiving side the inverse set of steps is executed, and instead of acquiring the data we render it and feed it 'via a direct video link' to a display, projector or other device for which the data was intended. This typical behaviour is further illustrated in FIG. 1.

Figure 2:
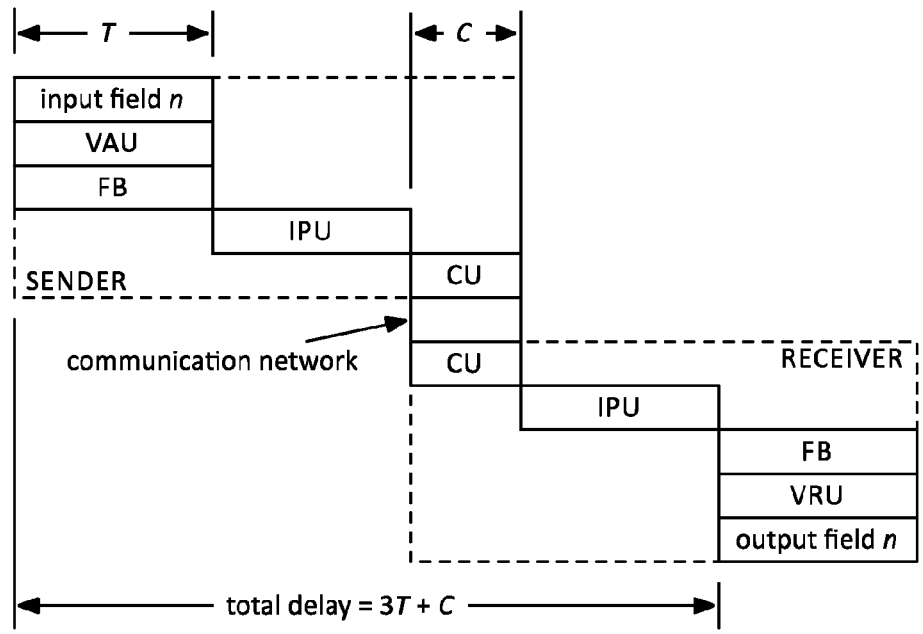
FIG. 2 is a timing diagram explaining the delay induced by a set-up as referred to in FIG. 1.

It needs limited further explanation that such a classic video communication unit always delays video when compared to a 'direct video link'. The delay hereby equals the time T to accumulate a frame in the frame buffer plus the time U needed for image processing (e.g. compression) plus the time C needed in the communication unit (e.g. sending/receiving data packets) of sender and receiver plus the time V needed for image processing at the receiver (e.g. decompression). In most cases, image processing units will be designed for real-time performance while controlling power consumption, i.e. U=V=T. The total latency, then, is 3T+C. This is illustrated in the timing diagram of FIG. 2. Given the video clocks of the source at the sender and the consumer (e.g. display) at the receiver are typically not synchronized, the actual delay will be even somewhat bigger.

Returning to embodiments of the present invention, the video communication systems according to these embodiments present an integrated embodiment which can work in a subframe or subfield based manner.

Figure 3:
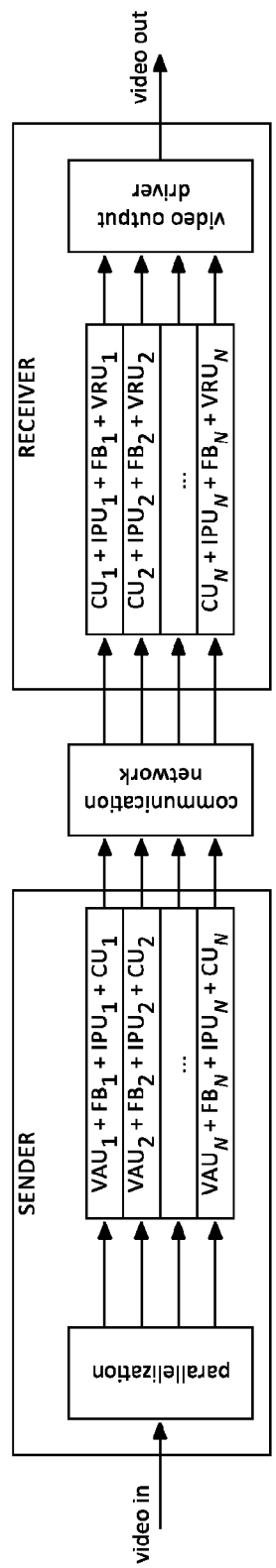
FIG. 3 depicts the proposed N-parallelization of the classic video communication scheme as referred to in FIG. 1.

Key to this is that the acquisition building block, image processing unit and the communication unit are no longer independent units which work one after the other, but are integrated in a single logical parallel processing unit, combining at least some actions in parallel. This unit is able to perform at least two actions simultaneously and advantageously acquire, and meanwhile process the part of the image already acquired, and meanwhile communicate the part of the image already processed. The receiving unit works similarly, but respectively receives, processes and renders the arriving data in parallel or performs at least two of these actions in parallel. FIG. 3 shows an overview of this processing.

Figure 4:
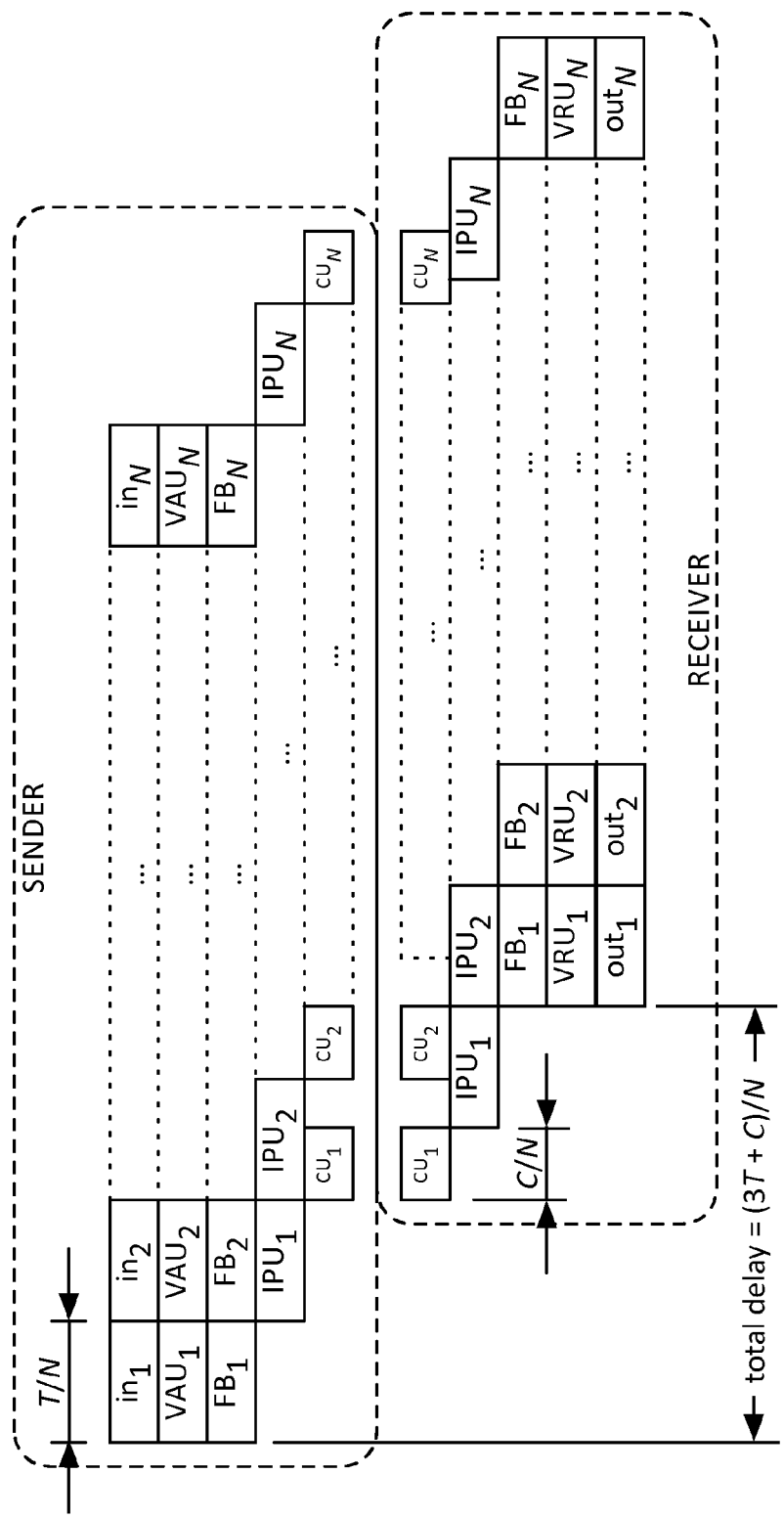
FIG. 4 is a timing diagram explaining the N-fold reduction of the overall delay obtained with the scheme depicted in FIG. 3, with respect to FIG. 2.

For the embodiment wherein all actions are performed in parallel, the image communication unit arrives at a completely different timing than the classic unit described above. If image processing and communication unit only consume a negligible time interval, the communication is even as fast as in case of a direct video link. E.g. as an example embodiment one can acquire video and in parallel packetize it and send it over an IP link (no image processing). The receiver depacketizes and reconstructs the image while the sender is still acquiring the image. See FIG. 4 for an updated timing diagram. The delay 3T+C is now theoretically reduced to (3T+C)/N, where N is the number of pixels, typically a very high number (millions). Therefore the obtained delay is negligibly small (a few to a few tens of microseconds).

The above embodiment only explains a first step. Real-time image processing consumes a time interval comparable to, but at most, the acquisition time or inter-frame/field time. However, in embodiments of the present invention this processing time no longer creates additional lead time in the overall timing. Given the unit is parallelized one can start processing data once the first pixel was acquired. In reality, a real embodiment with somewhat more complex processing typically cannot work on discrete pixels but typically needs areas of pixels in horizontal and vertical direction. (An exception can be the application of a lookup table.) Given one needs both horizontal and vertical data, and pixel data arrive sequentially on a line by line basis (i.e., in scanning order), we define the concept of an 'image slice'. The latter is a sub-image (or image block or image slice) which contains a set of complete horizontal image lines, but is incomplete in the vertical direction. In other words, image data sequentially arriving, horizontally aligned on a row by row basis forms a slice. An image slice of e.g. 16 or 32 lines starts to be spatially relevant enough to run image processing tasks on it (e.g. compression). One can think of a slice as an artificial very wide image with low height. Porting image processing from images to slices involves reducing spatial dependency by the height of the slice and making it possibly anisotropic. Secondly slice based processing should take care of the inevitable boundary effects at the slice's bottom and top.

This said slice based processing allows us to introduce almost any kind of advanced image processing, and hardly changes the timing. The meaning of the parallelism N in FIG. 4 changes from the number of pixels in a frame or a field to the number of slices in a frame or a field, which changes overall delay from "negligibly small" (typically microseconds) to "very low" (typically a few milliseconds).

The delay now sums to the waiting time to acquire the first slice, and the processing and sending time of a single slice. For example let us illustrate this based on a full HDTV 1080P60 image (1920×1080 pixels, progressively scanned at 60 frames per second), which for this example could be processed (e.g. video compression) at the inter-frame time (1/60 sec) and for which the communication unit consumes no time. In a classic video communication system we would need the accumulation time (1/60 sec)+the processing (compression) time at the sender (1/60 sec)+the processing (decompression) time at the receiver (1/60 sec). Assuming video clocks would be in sync we delay the video with 3/60 sec=50 msec. Most human observers can perceive this delay.

In the video communication system of embodiments of the present invention, with a slice of 16×1920 pixels, which is only 1/67.5 of the total image we get: 1/60*1/67.5 sec (waiting time for the first slice)+the processing (compression) time at the sender 1/60*1/67.5 sec+the processing (decompression) time at the receiver 1/60*1/67.5 sec=with 3/60*1/67.5 sec=0.74 msec. In this example we ignored the fact that the last slice will be incomplete, and has height 8 instead of 16. Important is to see that we get a more than 50 times speed up compared to a classic video system, and that the delay is smaller than $\frac{1}{20}^{th}$ of the inter frame time of ca 17 msec. This surplus delay cannot be noticed by a human observer, and typically does not affect any timing at all given the unsynchronized video clocks of producing and consuming video devices.

According to a further aspect, the present invention also relates to a method for transferring video data. The method is suitable for handling video data comprising image frames or image fields of video data. The method comprises acquiring or reconstructing an image frame or image field, processing at least part of the video data, and sending or receiving at least part of the data. According, to embodiments of the present invention, at least two of said acquiring or reconstructing, processing and sending or receiving are performed simultaneously by simultaneously handling different parts of the same image frame, the parts not being a complete image field, or different parts of the same image field of the video data. In some embodiments, all of said acquiring or reconstructing, processing and sending or receiving are performed simultaneously by simultaneously handling different parts of the same image frame, the parts not being a complete image field, or different parts of the same image field of the video data. By way of illustration, some specific method embodiments of the present invention will now be discussed in more detail.

In one embodiment, the method comprises obtaining at least a first image block and a second image block, each image block being part of a same image frame or a same image field, after obtaining the at least a first image block and during obtaining of the second image block, processing the first image block, and thereafter, before or during processing of the second image block, sending the first image block over a data network. The method also may comprise, upon receiving at least a first image block and a second image block, generating an image block header for the image block for identifying an image frame or field wherefrom the image block is derived. Such an image block header also may comprise other metadata, such as for example the fact that for encoding or decoding, no frames of the future may be used. This image block header information may be used for controlling the image processing. The method further may comprise further steps expressing the functionality of components illustrated in system aspects or examples of the present description.

In another embodiment, the method comprises receiving at least a first image block and a second image, each image block being part of a same image frame or a same image field, over a data network, after receiving the first image block and before or during receiving of the second image block, processing the first image block, and thereafter merging the at least first image block and the second image block, after these image blocks have been processed, into a single image frame or image field. The merging may be performed taking into account an image block header for the image block for identifying an image frame or field wherefrom the image blocks are derived. The method further may comprise further steps expressing the functionality of components illustrated in system aspects or examples of the present description. In some embodiments the method for sending and the method for receiving is combined and provides a further method for transmitting video data.

In still another embodiment, the method comprises obtaining at least a first image block and a second image block, each image block being part of a same image frame—but not being the complete image field—or being part of a same image field. The method also comprises, after obtaining the at least a first image block and before or during obtaining of the second image block, processing the first image block. In other words, processing of one image block has already started prior, while the second image block still is being obtained (e.g. read, received as input, . . . ).

In a further embodiment, the method comprising processing a first image block and a second image block, each image block being part of a same image frame—but not being the complete image field—or being part of a same image field. The method furthermore comprises, after processing the at least a first image block and before or during processing of the second image block, sending the first image block over a data network.

In another embodiment, the method comprising receiving at least a first image block and a second image, each image block being part of a same image frame or a same image field, over a data network, after receiving the first image block and before or during receiving of the second image block, processing the first image block. The method further may comprise thereafter merging the at least first image block and the second image block, i.e. after these image blocks have been processed, into a single image frame or image field.

The methods according to embodiments as described above may be combined with the steps of the other methods, without departing from the current invention. They further may comprise further steps expressing the functionality of components illustrated in system aspects or examples of the present description.

In still another aspect, the present invention relates to a computer program product for, when executing on a processing means, for example in a device according to the first aspect of the invention, carrying out one of the methods for transmitting video data, as well as to a corresponding processing system. In other words, methods according to embodiments of the present invention may be implemented as computer-implemented methods, e.g. implemented in a software based manner. One example of a processing system may be a processing system that includes at least one programmable processor coupled to a memory subsystem that includes at least one form of memory, e.g., RAM, ROM, and so forth. It is to be noted that the processor or processors may be a general purpose, or a special purpose processor, and may be for inclusion in a device, e.g., a chip that has other components that perform other functions. Thus, one or more aspects of embodiments of the present invention can be implemented in digital electronic circuitry, or in computer hardware, firmware, software, or in combinations of them. The processing system may include a storage subsystem that has at least one disk drive and/or CD-ROM drive and/or DVD drive. In some implementations, a display system, a keyboard, and a pointing device may be included as part of a user interface subsystem to provide for a user to manually input information. Ports for inputting and outputting data also may be included. More elements such as network connections, interfaces to various devices, and so forth, may be included.

The various elements of the processing system may be coupled in various ways, including via a bus subsystem, in the present example for simplicity a single bus, but will be understood to those skilled in the art to include a system of at least one bus. The memory of the memory subsystem may at some time hold part or all of a set of instructions that when executed on the processing system implement the steps of the method embodiments described herein.

In further aspects, the present invention relates to a data carrier for storing a software implemented controller for controlling video data transmission as described above or a data carrier storing a computer program product as described above or to the transmission of a computer program product over a wide or local area network. Such a data carrier can thus tangibly embody a computer program product as described above. The carrier medium therefore may carry machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

In still another aspect, the present invention relates to video data obtained after transmission using a method according to an aspect of the invention.

In yet another aspect, the present invention also relates to the use of a video data communication system as described above for transmission of endoscopic video data. Particular features and advantages are illustrated in the particular examples, such features and advantages not being limited to these particular examples. It also relates to the use of a video data communication system for combining multiple video data inputs and for providing multiple video data outputs or providing a merged data output. The use may be a use for obtaining visual delay free transport of video data, applicable in a number or particular applications.

It will be apparent to those skilled in the art that various modifications and variations can be made in process and methods of the present invention of an ultra low delay video communication unit. By way of illustration, embodiments of the present invention not being limited thereto, a number of particular examples will be shown below, illustrating standard and optional features of embodiments according to the present invention

EXAMPLE 1

No-visual Delay Compressed Video Transport Over IP

Present embodiment uses an analog or digital set of video interfaces, feeding the video line data immediately to the image processing unit. On the image processing unit an advanced slice-adapted version of an MPEG4 Advanced Simple Profile codec compresses the data in slices of height 32. Every slice is transferred by central processing unit to an ethernet controller which packetizes and sends the data over the network. A similar unit receives the video data via an ethernet controller, transfers it to an image processing unit which decompresses it, and finally renders the data to a video interface on DVI, VGA or (HD)-SDI. The overall delay in this system when compared to a direct video link, for an image pixel in one case electrically/optically travelling over the direct link (0 msec) is less than 5 msec. The bandwidth reduction brings a typically 1.5 Gbps HDTV signal back to below 50 Mbps at a visual lossless quality.

The communication by the ethernet controller and presence of a central processing unit allows us to implement strong encryption on the communication if desirable. If no delay at all is desirable, and bandwidth forms no limitation one can disable the compression and send raw video data over the link. The bandwidth of the ethernet controller however should support this. This said, in the present embodiment with a twisted pair based Gigabit Ethernet PHY, this option is limited to SD resolutions. HD resolutions could be similarly supported via a fiber optic Ethernet interface. The system is self contained, passively cooled, receives power over ethernet 'PoE' and consumes typically only 15 watt.

Not a single system with similar characteristics is commercially available or described in literature or patent descriptions.

Figure 5:
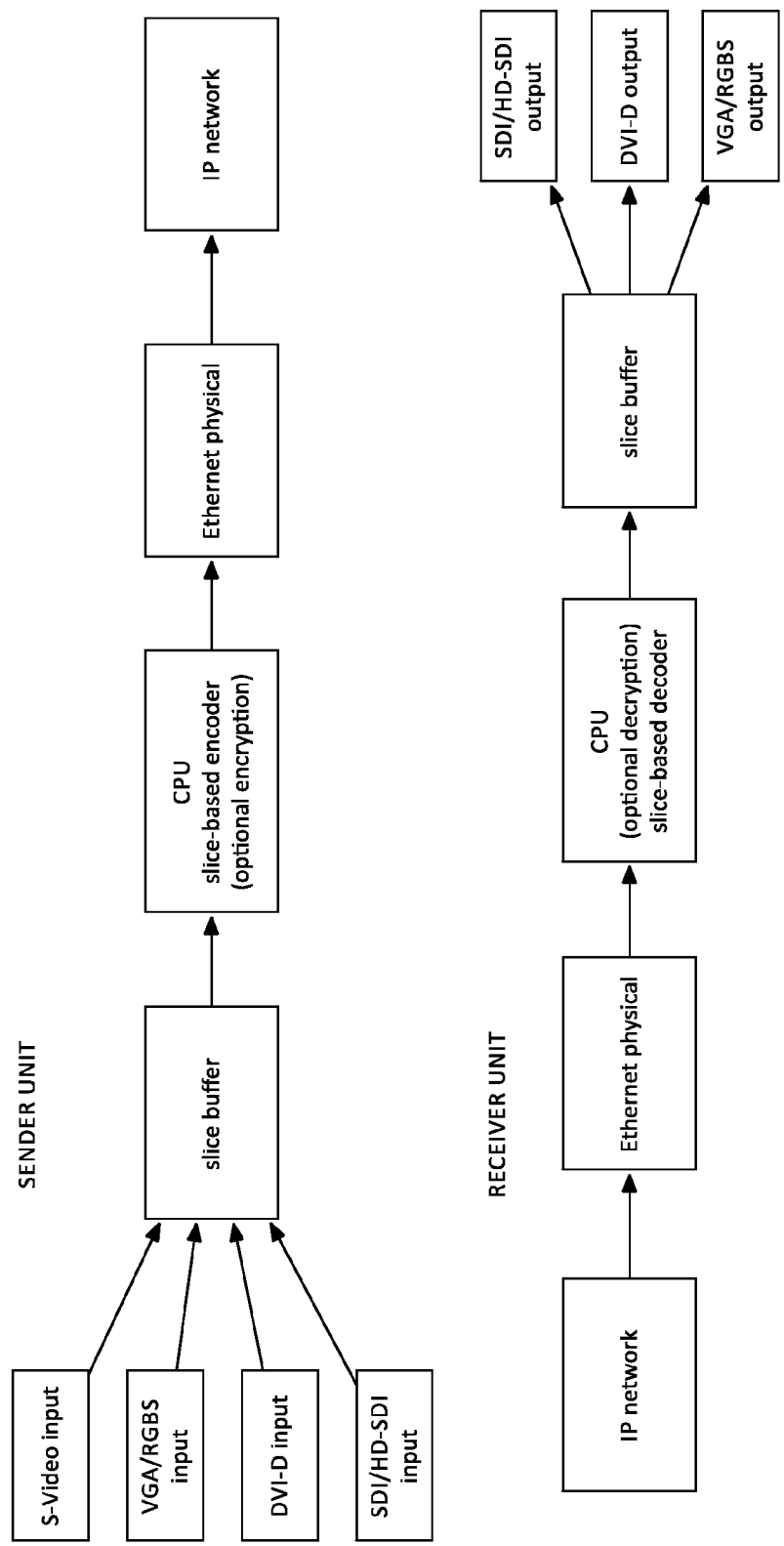
FIG. 5 illustrates a block diagram of a video communication system according to an embodiment of the present invention.

A block diagram of this embodiment is presented in FIG. 5.

EXAMPLE 2

Minimal Invasive Surgery/Diagnosis Over IP

The embodiment as described above is used to implement multi sender multi receiver local communication systems which transport endoscopic surgical video between endoscopic camera and surgical displays. The embodiment consolidates any kind of video signal on an IP based network, and scales to an almost unlimited number of inputs and outputs.

The system has a visual lossless compression quality, and presents no visual delay. This can be demonstrated via acceptance by surgeons which base eye-hand synchronization on the IP based video feed.

This embodiment additionally implements a set of slice based image enhancement steps which improve the diagnostic quality of the image (LUT/gamma correction, feature retrieval and highlighting, . . . )

EXAMPLE 3

IP Based Machine Vision

In computer algorithm controlled inspection machine it is often a problem to place the computing system and the camera at a distance supported by a direct video link. E.g. in manufacturing a factory can be a hostile environment for a computing system, whereas typical direct video links cannot carry the signal over a longer distance. Similarly image based marine navigation requires cameras high above the water, whereas computing power is only available tens of meters away.

Any of the above machine vision systems which implements a control loop heavily suffers from delay (time constant in a feedback based control loop). The present embodiment overcomes these limitations via delay free IP based video transport, which at the level of the computing platform immediately can offer digital images to a CPU instead of converting it back to a video interface.

The invention claimed is:

1. A video data communication system for ultra-low latency (ULL) video communication, the system comprising:
    at least one video data transmission unit for sending or receiving video data over a data network, the transmission unit comprising:
        an image acquiring circuitry or an image reconstruction circuitry for acquiring or reconstructing an image frame or image field,
        a video processing unit for processing at least part of the video data, and
        a communication unit for sending or receiving at least part of the data,
    wherein at least two of the image acquiring circuitry or image reconstruction circuitry, the video processing unit and the communication unit are arranged for simultaneously handling different parts of a same image frame, the parts being an incomplete image field, or different parts of a same image field of the video data.

2. A video data communication system according to claim 1, wherein all of the image acquiring circuitry or image reconstruction circuitry, the video processing unit and the communication unit are arranged for simultaneously handling different parts of a same image frame or same image field of the video data.

3. A video data communication system according to claim 1, wherein
    the image acquiring circuitry comprises an image divider configured for dividing an image frame or image field into image blocks comprising a part of the image frame or field being one or more lines of pixels of the image frame or field, or
    the image reconstruction circuitry comprises an image merger configured for merging image blocks comprising only a part of an image frame or image field being one or more lines of pixels of the image frame or field in a full image frame or image field.

4. A video data communication system according to claim 3, wherein the video communication system comprises an image block header generating means configured for generating an image block header for the image block for identifying an image frame or field wherefrom the image block is derived.

5. A video data communication system according to claim 1, wherein the video processing unit comprises an encoder or decoder configured for encoding or decoding image blocks comprising only a part of an image frame or image field.

6. A video data communication system according to claim 1, wherein the communication unit is configured for sending or receiving data representative of an image block comprising only a part of an image frame or image field.

7. A video data communication system according to claim 1, wherein the at least one video data transmission unit is a video sender or a video receiver.

8. A video data communication system according to claim 1, wherein the video communication system comprises both
    a video sender comprising an image acquiring circuitry, a video processing unit and a communication unit arranged for simultaneously handling different parts of a same frame or same field of the video data, and
    a video receiver comprising a communication unit, a video processing unit and an image reconstruction circuitry arranged for simultaneously handling different parts of a same frame or same field of the video data,
    the system furthermore being adapted for the video sender and the video receiver simultaneously handling different parts of the same frame or same field of the video data.

9. A video data communication system according to claim 4, wherein the reconstruction circuitry is configured for reconstructing frames or fields taking into account image block headers of the image blocks.

10. A video data communication system according to claim 1, the video communication system being a software-implemented controller.

11. A video data communication system according to claim 1,
    wherein the video processing unit comprises a compressing or decompressing unit configured for compressing or decompressing image blocks comprising only a part of an image frame or image field, and/or
    wherein the video processing unit comprises an encrypting or decrypting unit configured for encrypting or decrypting image blocks comprising only a part of an image frame or image field.

12. Use of a video data communication system according to claim 1, in transmission of endoscopic video data and/or for combining multiple video data inputs and for providing multiple video data outputs or providing a merged data output and/or for obtaining visual delay free transport of video data.

13. A method for transferring video data of ultra-low latency (ULL) video communication, the video data comprising image frames or image fields of video data, the method comprising:
    acquiring or reconstructing an image frame or image field,
    processing at least part of the video data, and
    sending or receiving at least part of the data,
    wherein at least two of said acquiring or reconstructing, processing, and sending or receiving are performed simultaneously by simultaneously handling different parts of the same image frame, the parts being an incomplete image field, or different parts of the same image field of the video data.

14. A method for transferring video data according to claim 13, wherein all of said acquiring or reconstructing, processing and sending or receiving are performed simultaneously by simultaneously handling different parts of the same image frame, the parts not being a complete image field, or different parts of the same image field of the video data.

15. A method for transferring video data according to claim 13, the method comprising:
    obtaining at least a first image block and a second image block, each image block being part of a same image frame or a same image field,
    after obtaining the at least a first image block and during obtaining of the second image block, processing the first image block, and thereafter,
    before or during processing of the second image block, sending the first image block over a data network.

16. A method for transferring video data according to claim 15, the method further comprising, upon receiving at least a first image block and a second image block, generating an image block header for the image block for identifying an image frame or field wherefrom the image block is derived.

17. A method for transferring video data according to claim 13, the method comprising:
    receiving at least a first image block and a second image, each image block being part of a same image frame or a same image field, over a data network,
    after receiving the first image block and before or during receiving of the second image block, processing the first image block, and thereafter merging the at least first image block and the second image block, after these image blocks have been processed, into a single image frame or image field.

18. A method for transferring video data according to claim 17, wherein at least said merging is performed taking into account an image block header for the image block for identifying an image frame or field wherefrom the image blocks are derived.

19. A computer program product programmed for, when executing on a processing unit, transferring video data according to the method of claim 13.

20. A data carrier medium storing a computer program product according to claim 19.

* * * * *